United States Patent [19]

Nodov

[11] 4,258,395

[45] Mar. 24, 1981

[54] DOCUMENT SCANNING SYSTEM

[75] Inventor: Eugene Nodov, Richardson, Tex.

[73] Assignee: The Mead Corporation, Dayton, Ohio

[21] Appl. No.: 75,052

[22] Filed: Sep. 12, 1979

[51] Int. Cl.³ .............................................. H04N 1/10
[52] U.S. Cl. .................................... 358/293; 358/294
[58] Field of Search ................................ 358/293, 294

[56] References Cited

U.S. PATENT DOCUMENTS

| 2,939,370 | 6/1960 | Bouffilh | 354/10 |
| 3,450,464 | 6/1969 | Guffon | 354/10 |
| 3,468,229 | 9/1969 | Bellows | 354/95 |
| 3,694,070 | 9/1972 | Libby | 355/8 |
| 3,709,062 | 1/1973 | Satomi | 74/722 |
| 3,784,277 | 1/1974 | Baker | 354/94 |
| 4,002,829 | 1/1977 | Hutchison | 358/293 |
| 4,025,154 | 5/1977 | Yuta | 358/206 |
| 4,112,469 | 9/1978 | Paranjpe | 358/296 |

OTHER PUBLICATIONS

Smith, *Modern Optical Engineering* pp. 82–85.

*Primary Examiner*—Howard W. Britton
*Attorney, Agent, or Firm*—Biebel, French & Nauman

[57] ABSTRACT

A system for scanning a document positioned on a flat support and generating electrical signals representing the observed image information. Means are provided for scanning an elongated beam of illuminating light across the document from end to end and simultaneously imaging the illuminated region upon a line of photodetectors. The photodetectors are spaced apart for viewing different portions of the imaged strip. An image shifting arrangement shifts the image in synchronism with the document scan, so that all portions of the imaged document are viewed at one time or another by one of the photocells comprising the photodetector array. A field flattening arrangement operates in synchronism with document scanning so as to provide continuous focusing adjustment. The electrical signals which are generated by the system are suitable for controlling an ink jet printer or other electrically operated dot matrix recorder.

7 Claims, 17 Drawing Figures

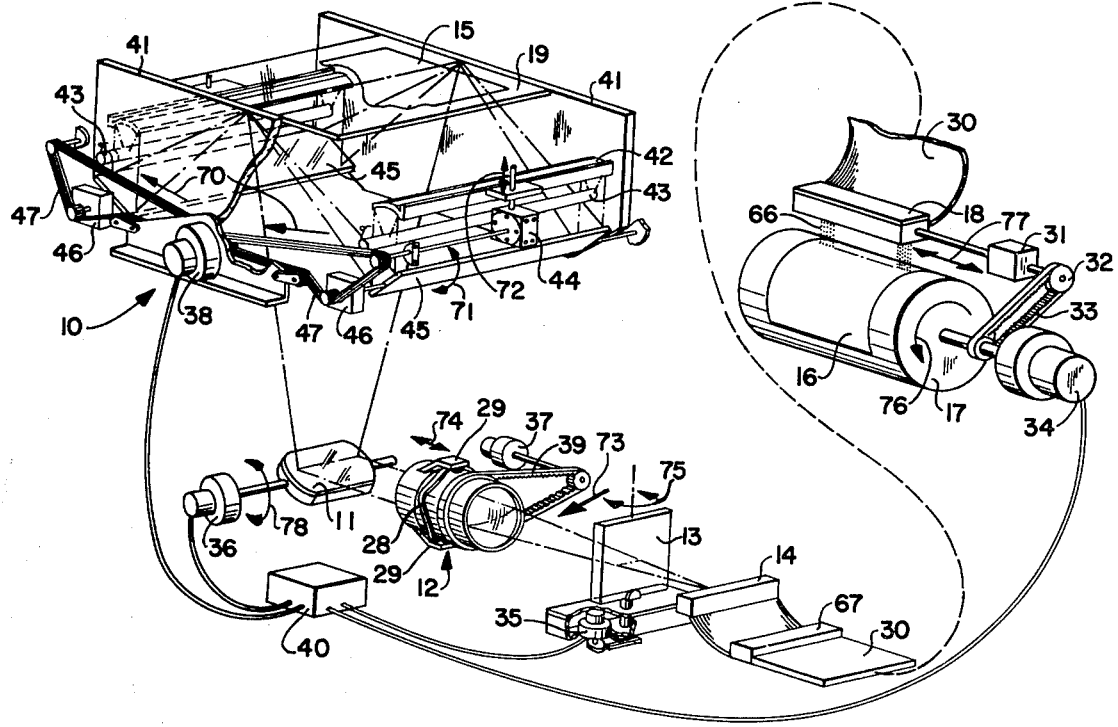

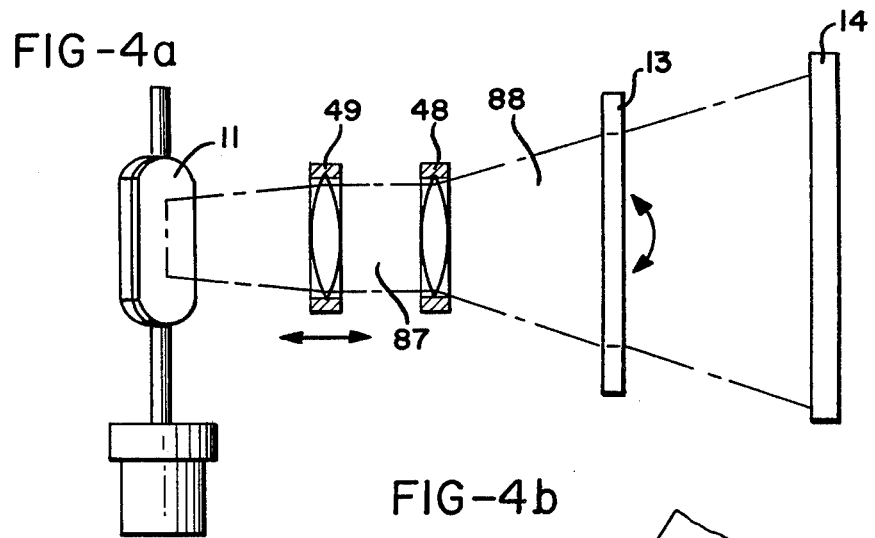
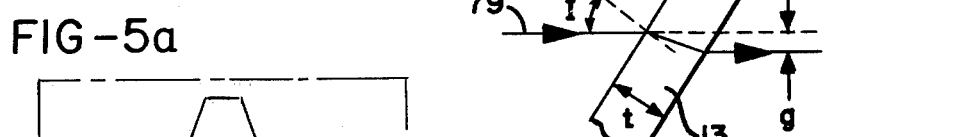
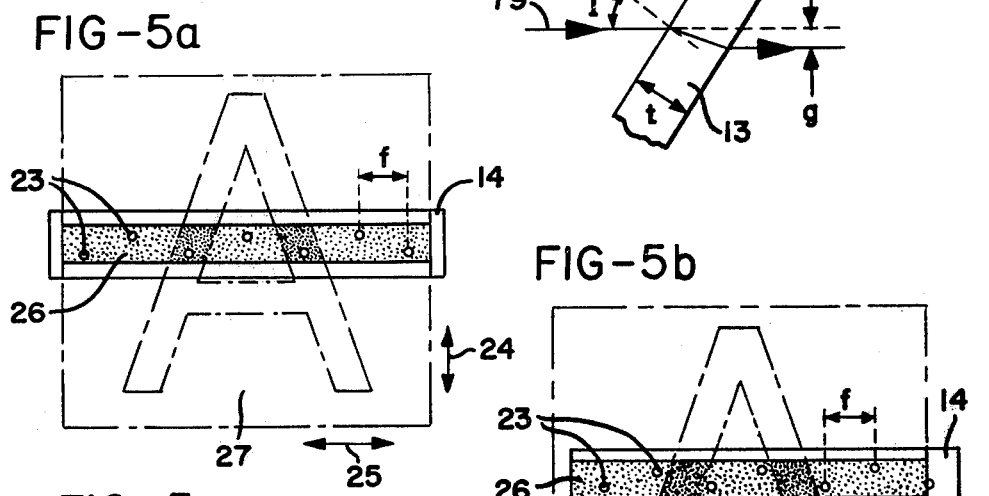
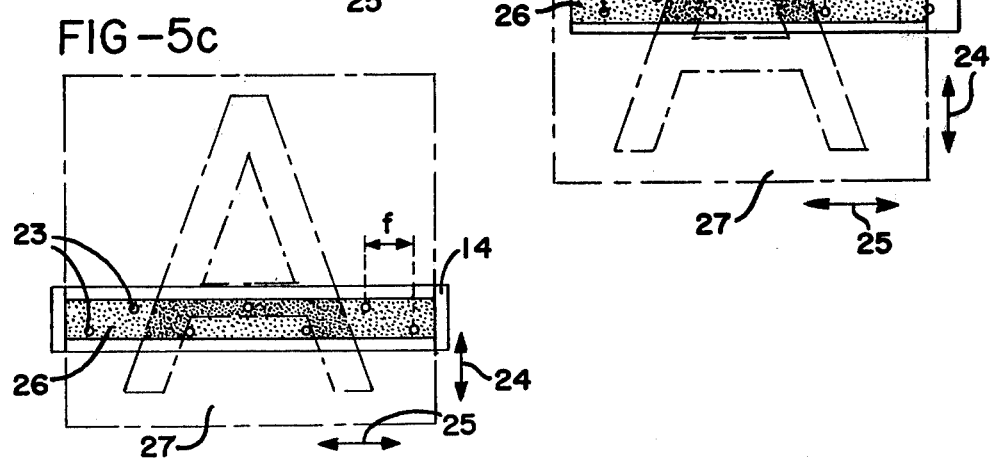

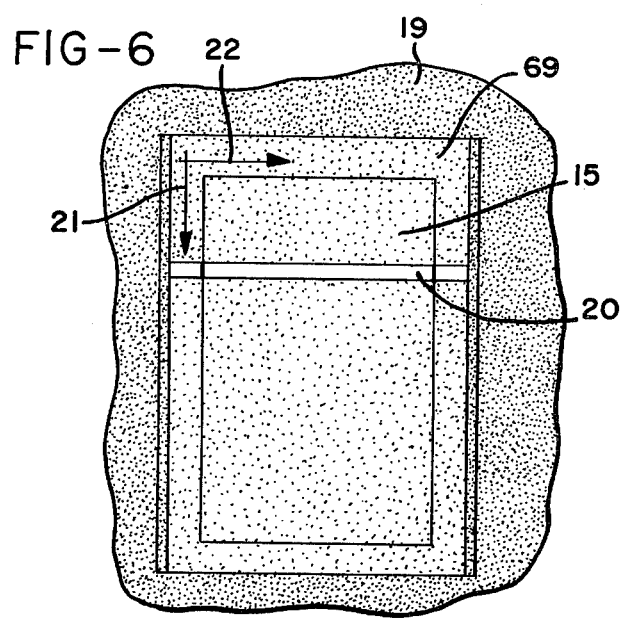
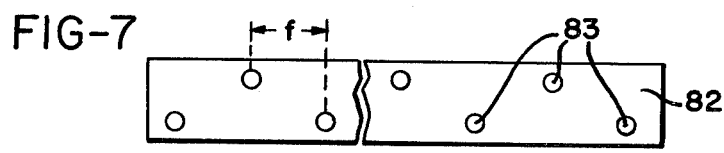
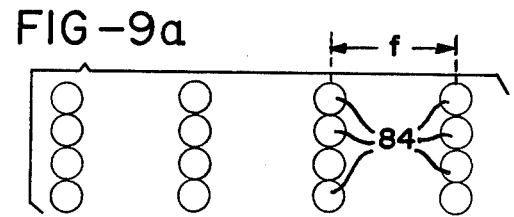
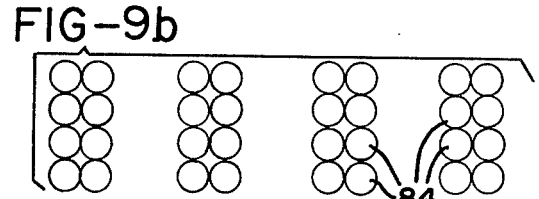
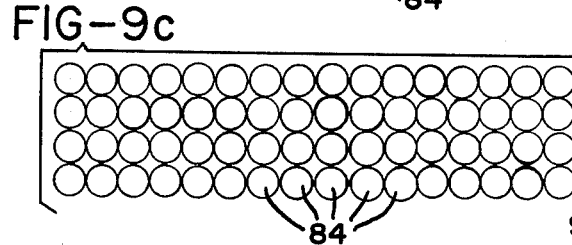
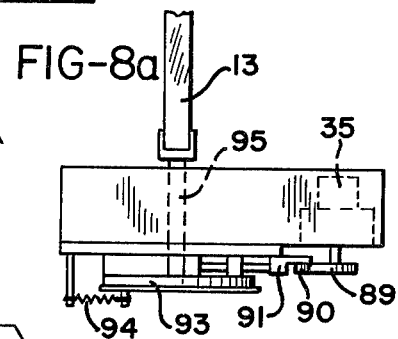
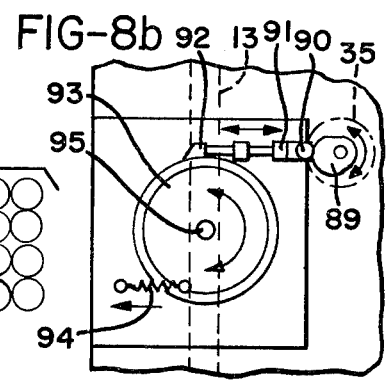

DOCUMENT SCANNING SYSTEM

CROSS-REFERENCE TO RELATED APPLICATIONS

This application is related to application Ser. No. 075,067 entitled Lens System for Document Scanning, application Ser. No. 075,063 entitled Jet Drop Copying System, and application Ser. No. 075,054 entitled Document Illumination System, all filed on even date herewith and all assigned to the assignee hereof.

BACKGROUND OF THE INVENTION

This invention relates to a system for scanning a document, which is positioned on a flat document support, and generating electrical signals representing the image information contained within the scanned areas of the document. The invention relates more particularly to systems for scanning a flat document surface and generating a series of electrical signals which are suitable for controlling an ink jet printer or other electrically operated dot matrix recorder. One such prior art system is disclosed in Paranjpe et al U.S. Pat. No. 4,112,469.

The scanning system disclosed in Paranjpe et al is particularly suitable for use in an ink jet office copier. In the system as disclosed there are a group of photocells which observe a series of points along a relatively short scan line. The system utilizes an interlacing scan technique and produces a copy in about one second. A rotating mirror is provided for scanning the document in one direction. Scanning in the transverse direction is provided by mounting the optical system on a movable table.

While the system as taught by Paranjpe et al is suitable as an office copier, it has inherent speed limitations which restrict its adaptability to higher speed applications. Such higher speed applications include the duplicating field, wherein two or more copies per second may be required. Heretofore there has been no scanning system capable of scanning a flat document at such speeds and producing scanning signals suitable for controlling an electrically operated dot matrix recorder.

SUMMARY OF THE INVENTION

According to the present invention there is provided a document scanning system wherein an elongated beam of illuminating light creates an illuminated strip extending in a first direction across a flat document plane. An illumination scanner causes the beam of illumination to move cyclically across the document in a second direction perpendicular to the first direction. An imaging means observes the illuminated strip and projects an image of the strip toward an image plane for observation by an array of photodetectors. There is an image scanner which controls the viewing angle of the imaging means in synchronism with movement of the illuminating beam, so that an image of the illuminated strip remains centered upon the photodetectors. There is also an image shifting means which causes image shifting from side to side, so that each point within the image can be observed by one of the photocells. Field flattening means operate in synchronism with the image scanner to maintain the image plane coincident with the plane of the photodetector array throughout the range of optical path length variation produced by angular scanning of the flat document plane.

DESCRIPTION OF THE DRAWING

FIG. 4a is a schematic top plan view of optical elements which produce lateral image shifting.

FIG. 4b is a schematic illustration of the shifting of a light ray by a plane parallel plate.

FIGS. 5a through 5c illustrate the lateral and longitudinal motion of an image.

FIG. 6 is an illustration of an illuminated strip on a document.

FIG. 7 is an illustration of an orifice plate for an ink jet printer.

FIG. 8a is a front elevation view of drive mechanism for an image shifting plate.

FIG. 8b is a bottom plan view of drive mechanism for an image shifting plate.

FIGS. 9a through 9c illustrate progressive printing by an ink jet printer.

DESCRIPTION OF THE PREFERRED EMBODIMENT

Figure 1:
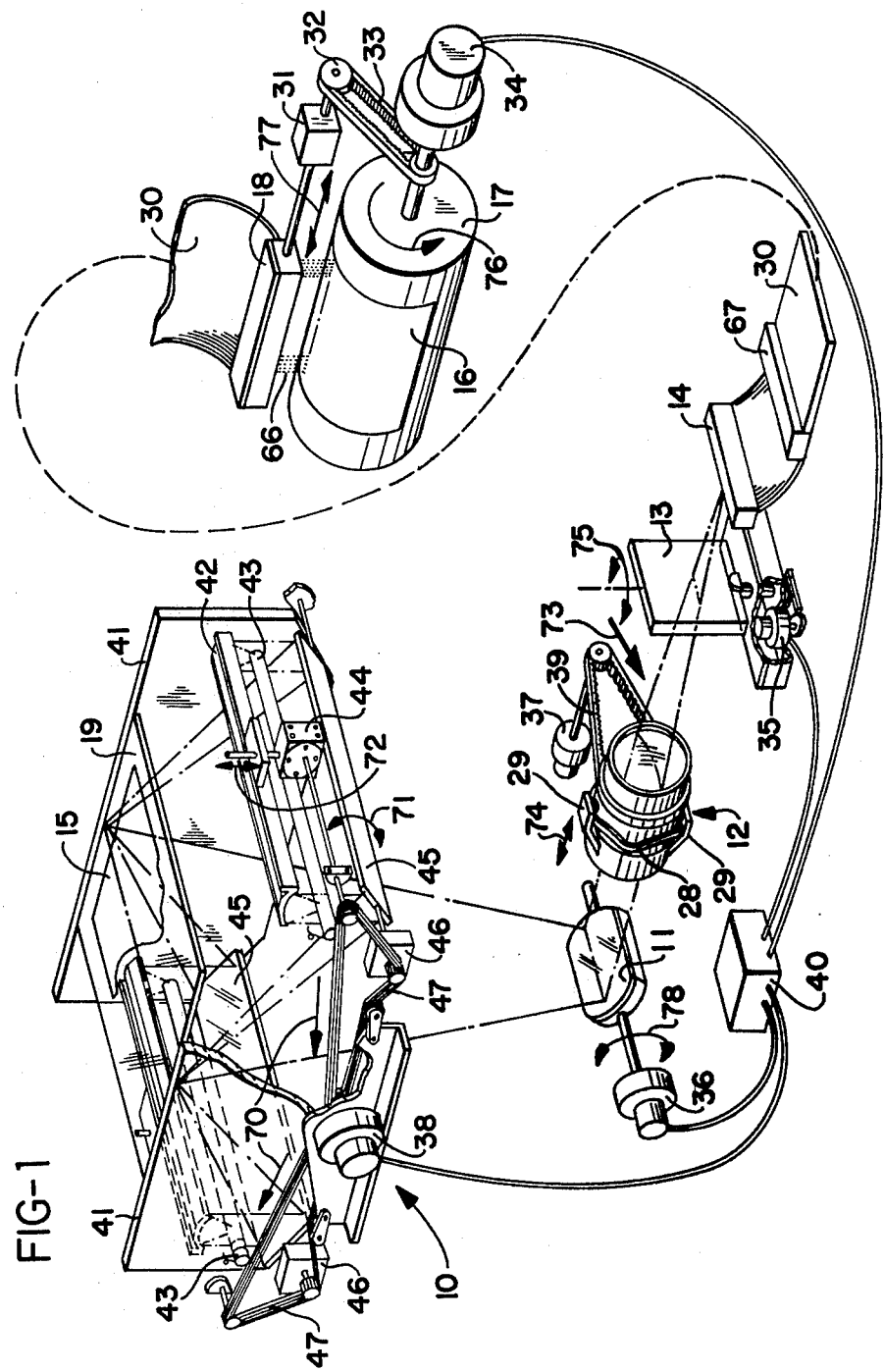
FIG. 1 is a pictorial illustration of a document reproduction system including a scanning system according to this invention.

A preferred embodiment of this invention as illustrated in FIG. 1 comprises an illumination station 10, a scanning mirror 11, a lens system 12, an image shifting plate 13, and a photodetector array 14. Illumination station 10 includes a flat surface 19 for supporting a document 15. The document 15 is scanned by two synchronously driven narrow beams of light, as hereinafter described, to create a narrow illuminated light strip extending across one dimension of the document. The document portion which is so illuminated is imaged upon the face of photodetector array 14.

This invention has particular adaptability for use with a dot matrix recorder as also generally illustrated in FIG. 1. Thus photodetector array 14 may supply sensing signals to a conventional set of printing control electronics 67, which are connected by a set of electrical cables 30 to print head 18. Preferably print head 18 is a print head for an ink jet printer and is constructed as generally described in Paranjpe et al Ser. No. 075,055, entitled Improved Ink Jet Printer and filed on even date herewith. Print head 18 generates and controls a series of jets 66 for printing a representation of the scanned area of document 15 upon a print sheet 16 mounted on a rotating drum 17.

Printing drum 17 is rotated by a drive motor 34 under control of a control unit 40. Drive motor 34 also drives a gear 32 by means of a toothed drive belt 33. Gear 32 operates a cam arrangement shown generally at 31, and cam arrangement 31 produces lateral oscillation of print head 18 as illustrated by the double headed arrow 77. Rotation of drum 17 proceeds as indicated by the arrow 76 in synchronism with the oscillation of print head 18 and the scanning of document 15 as hereinafter described.

Scanning of document 15 will now be described with reference to FIG. 6, wherein the document 15 is illustrated as being positioned upon a supporting glass plate 69 within the support surface 19. Document 15 is illuminated by an elongated beam of light to create a narrow illuminated strip 20 extending laterally across the document in a first direction parallel to the directional arrow 22. The beam of illuminating light is scanned longitudinally across document 15 in a second direction as indicated by the arrow 21.

Figure 3:
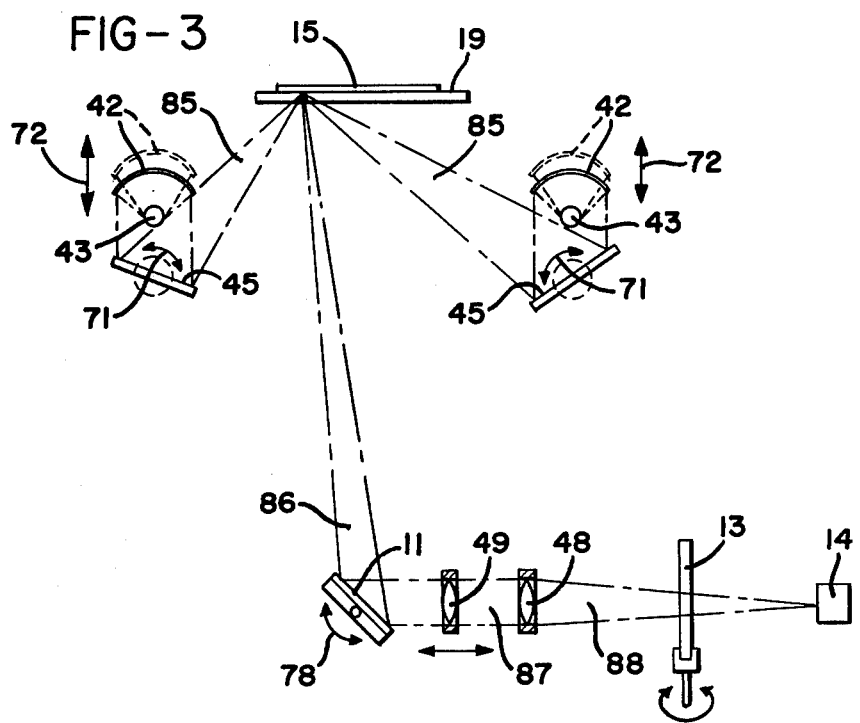
FIG. 3 is a schematic front elevation view of a document scanning system.

Apparatus for creating and scanning the illuminated strip 20 is shown schematically in FIG. 3 as including a pair of illuminating lamps 43, 43, a pair of focusing reflectors 42, 42, and a pair of flat reflecting mirrors 45, 45. The illuminating lamps 43, 43, extend transverly across illuminating station 10, as best illustrated in FIG. 1. Light which is generated by lamps 43, 43, is focused by focusing reflectors 42, 42, into a pair of converging light beams 85, 85. Light beams 85, 85, are directed toward mirrors 45, 45, for convergence at the surface of document 15. The convergence of beams 85, 85, at the surface 15 defines illuminated strip 20.

Scanning of beams 85, 85, is accomplished by synchronous oscillation of mirrors 45, 45, as indicated by the directional arrows 71, 71. For this purpose there are provided a pair of conjugate cam mechanisms 46, 46, as illustrated generally in FIG. 1 and described in detail in Ser. No. 075,054. A pair of timing belt assemblies 70, 70, are driven by an electric motor 38 in the direction of the arrows 70, 70, to operate cam mechanisms 46, 46, for causing forward scanning and high speed flyback of mirrors 45, 45.

Illuminated strip 20 comprises superimposed one-dimensional images of the electrical filaments within illumination lamps 43, 43. In order to maintain one-dimensional focus of the filaments, reflectors 42, 42, are moved vertically back and forth under control of conjugate cam mechanisms 44, 44, as indicated by the arrows 72, 72. The movement of reflectors 42, 42, proceeds in synchronism with the scanning oscillation of mirrors, 45, 45, so as to maintain the illuminated strip 20 at the focal lines of both of reflectors 42, 42. This produces a very narrow and intense strip of illumination. Cam mechanisms 44, 44, are also driven by timing belt assemblies 70, 70, and are described more fully in Ser. No. 075,054.

Preferably reflectors 42, 42, are of generally trough shaped configuration with an elliptical cross-section. This configuration produces the above mentioned one-dimensional image of the illumination filaments, without production of any observable representation of the actual structure of the electrical filaments. The creation of the intense, superimposed one-dimensional images of the electrical filaments of lamps 43, 43, is substantially enhanced by side mirrors 41, 41, as more fully described in Ser. No. 075,054.

Reflected light from illuminated strip 20 is directed toward a scanning mirror 11, which projects an image of the illuminated region of the document upon the face of photodetector array 14. A D.C. electrical servomotor 36 operates under control of control unit 40 to give mirror 11 an oscillating rotational motion as illustrated by the arrow 78. An optical grating on the glass 69 (not illustrated) is imaged upon one of the photodetectors to provide an appropriate feedback control signal, as described in detail in Monette Ser. No. 950,253 filed Oct. 10, 1978.

The rotation of mirror 11 proceeds in synchronism with the oscillating movement of mirrors 45, so that the photodetector array 14 always looks at that portion of the document which is being illuminated. Printing system drive motor 34 operates in synchronism with the forward scanning movment of scanning mirror 11. An optical scanner positioned adjacent printing drum 17 (not illustrated) detects the positioning of paper 16, so that control unit 40 is able to assure flyback of mirrors 11 and 45 during the time while the back side of the drum is being presented to print head 18.

Photodetector array 14 comprises a series of photodetectors 23 arranged in two interlaced rows as illustrated generally in FIGS. 5a through 5c. This arrangement of photodetectors corresponds to the arrangement of an array of orifices 83 in orifice plate 82 (FIG. 7). Orifice plate 82 communicates with an ink manifold in print head 18 for production of the array of jets 66. Jets 66 are stimulated for production of streams of uniformly sized and regularly spaced drops by stimulation technique as generally described in Cha U.S. Pat. No. 4,095,232. The drops which are so generated are selectively charged, deflected and caught as taught in Ser. No. 075,055.

Due to the center-to-center separation of jets 66, those drops which are directed toward recording sheet 16 print a series of separated tracks of dots 84, as illustrated in FIG. 9a. The separation distance f is the same as the separation distance between the centers of photodiodes 23 (so long as no image reduction or enlargement is desired). This separation distance is selected so as to minimize the amount of scanning and drop control electronics consistent with the required operating speed of the system.

For a printing system which produces 120 copies per minute, the distance f may be about 0.0075 inches, and the printed dot diameter may be adjusted to span roughly one-fourth of the total distance between tracks. This produces a printing resolution slightly greater than 500 lines per inch, but the system requires a certain amount of lateral movement of print head 18 relative to drum 17 and a corresponding lateral movement in the imaging system.

Lateral movement of print head 18 is produced by cam mechanism 31. The lateral movement proceeds in sychronism with the rotation of drum 17, so that on successive rotations of the drum the jets print tracks which adjoin the tracks printed on immediately preceding rotations. Thus the printer prints a first set of tracks as illustrated in FIG. 9a on the first rotation of the drum and then a follows this with a second set of tracks as illustrated in FIG. 9b. The process continues until solid coverage is achieved, as illustrated in FIG. 9c. The system is preferably designed to print from right-to-left and from left-to-right, so that flyback of the print head is not required. There is no spiral interlacing of the tracks, and this substantially decreases the amount of required print head movement.

The technique for image shifting will now be described with reference to FIGS. 4a through 4c. In this connection it is to be noted that there is no relative lateral movement between the imaging optics and the document 15. Document scanning progresses only in the longitudinal direction, as described above, and the same regions are illuminated and scanned four times in succession. Between longitudinal scans of the document the scanning plate 13 is rotated a very small angular distance, so that the light rays reflected toward the document 15 are directed toward different positions on photodetector array 14. This shifting of the image relative to the photodetector array enables all portions of the document to be viewed by the photodetectors.

FIGS. 4a and 4b illustrate the movement of image shifting plate 13 and the resultant movment of the image relative to a photodetector array 14. FIG. 4b is an enlarged view of a portion of FIG. 4a and illustrates the path of a ray of light 79 through the plate 13. For clarity of illustration the figure shows a fairly large tilt angle for the plate 13. It will be understood that the angle of incidence I actually never gets greater than about 2° for the embodiment of the invention as herein described. The entire arrangement operates in a manner similar to an optical micrometer so that the shifting distance g is given approximately by the formula:

$$g = \frac{tI(N-1)}{N}$$

where t is the thickness of plate 13, N is the index of refraction of the glass comprising plate 13, and I is expressed in radians. In a typical embodiment of the invention the thickness t may be about 0.63 inches and the index of refraction N about 1.517, so that an angular rotation of 0.5 (0.00873 rad.) degrees produces an image displacement of 0.001875 inches to match the movement of print head 18 during one rotation of printing drum 17.

The mechanism for rotating the image shifting plate 13 is illustrated in detail in FIGS. 8a and 8b. The driving element is stepping motor 35, which rotates a cam 89 in response to control signals from control unit 40. Cam 89 bears against a cam follower 90 which is mounted on a push rod 91. Rotational motion of cam 89 causes push rod 91 to push against an ear 92 of a disc 93. Disc 93 is mounted on the support shaft 95 for image shifting plate 13 and is caused to oscillate in stepwise fashion by the pushing motion of push rod 91 and the return action of a return spring 94.

The surface of cam 89 is configured so as to produce rotational motion of plate 13 which corresponds to the linear movement of print head 18. As explained above, the printer prints bidirectionally from left-to-right and from right-to-left. Accordingly plate 13 oscillates progressively back and forth, without flyback between scans.

The bundle of light rays which are reflected from the face of document 15 and which are scanned and shifted as described above, are illustrated in FIG. 3 as generally indicated at 86. These rays are reflected by mirror 11 toward a collimating lens 49 to produce a bundle of collimated rays as indicated at 87. These collimated rays pass through a focussing lens 48 and become a converging bundle of rays as indicated at 88. The ray bundle 88 produces image of the illuminated document portion within an imaging "Window" 26 positioned on the face of photodetector array 14 as illustrated in FIGS. 5a through 5c. The image within the window 26 forms only a portion of a larger "potential" image 27 as outlined by phantom lines. The larger potential image represents the image which would be present at the image plane, if the entire face of document 15 were being observed at any one time.

FIGS. 5a and 5b depict the relative position of image 27 at corresponding times during different scans of the mirror 11 and illustrate shifting movement of the image in the direction 25. During the course of one complete scanning cycle by mirror 11, image 27 is shifted laterally a distance equal to the viewing width of one photodetector. Thus after 4 complete scans, all areas of the document 15 have been viewed by one or another of photodetectors 23. FIG. 5c illustrates the scanning movement which is produced in the direction 24 by scanning rotation mirror 11.

Figure 2:
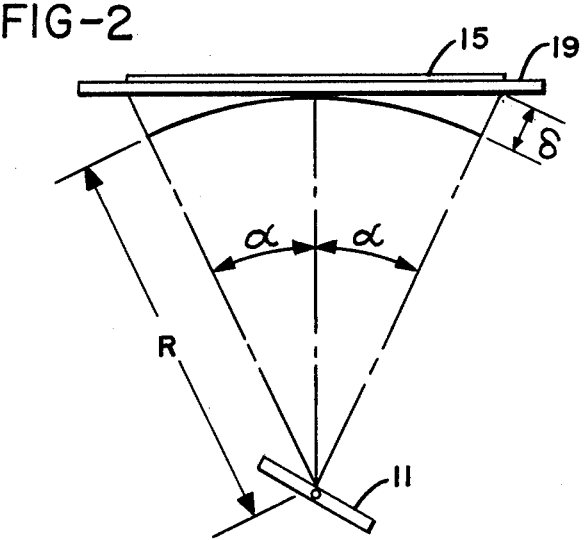
FIG. 2 is a pictorial illustration of the change in object distance associated with angular scanning of a flat document.

When document 15 is scanned by scanning mirror 11 and focussed upon the face of photodetector array 14, there is an accompanying variation in the length of the optical path between the illuminated strip 20 and the image window 26. This can be seen by referring to FIG. 2, wherein scanning mirror 11 is illustrated as scanning a document having a length subtending an angle $2\alpha$ at the face of the mirror. When the mirror is at the mid point of its scan, the distance from the center of the mirror to the imaged strip on the document is R. When the mirror is at the far ends of its scan that distance increases by an amount $\delta$ as illustrated. This distance $\delta$ arises by virtue of the fact that document 15 is supported on a flat surface. The path length increase is given approximately by the equation:

$$\delta = R(\sec \alpha - 1)$$

The above mentioned increase in the optical path length creates a problem in maintaining a sharp focus for the image within the window 26. This problem is solved in a first emodiment of the invention by providing means for moving the lens 49. Lens 49 is a collimating lens and is positioned such that the surface of the document 15 is at the focal point of the lens. Lens 49 is moved in sychronism with the rotation of mirror 11, so that the light beam 87 at all times comprises collimated bundles of light rays from the different points along the length of illuminated strip 20. Lens 48 images these rays on the face of photodetector array 14, and the imaging operation is entirely insensitive to variations in the distance between lenses 48 and 49.

In actual practice it is found that an arrangement of a collimating lens and a focusing lens, as illustrated in FIG. 3, cannot be designed in a manner as for fully correcting the various aberrations and distortions which are inherent in the operation of the system. Accordingly, lens system 12 preferably incorporates additional correcting elements as described in detail in Ser. No. 075,067.

Lenses 48 and 49 together with the necessary correcting lenses are incorporated within a telescopic housing, as illustrated in FIG. 1. There is a barrel cam 28 surrounding the housing, and this cam is engaged by a cam follower 29. There is a drive motor 37 connected to control unit 40 for rotating lens system 12. Drive motor 37 drives a timing belt 39 continually in one direction as indicated by the arrow 73.

Timing belt 39 rotates lens system 12, and during the course of this rotation, the cooperative action of cam 28 and cam follower 29 cause the rear portion of the lens housing to oscillate back and forth as indicated by the double headed arrow 74. The oscillating movement of the rear portion of the lens housing causes corresponding movement of lens 49 which is incorporated therein. Cam 28 is configured to produce movement corresponding to variations in the distance $\delta$. Drive motor 37 produces one complete rotation of lens system 12 for each operating cycle of mirror 11. During the course of this rotation lens 49 goes through two complete movement cycles corresponding to the cyclic variations in the distance δ occurring while mirror 11 is performing its forward scanning motion.

Figure 10:
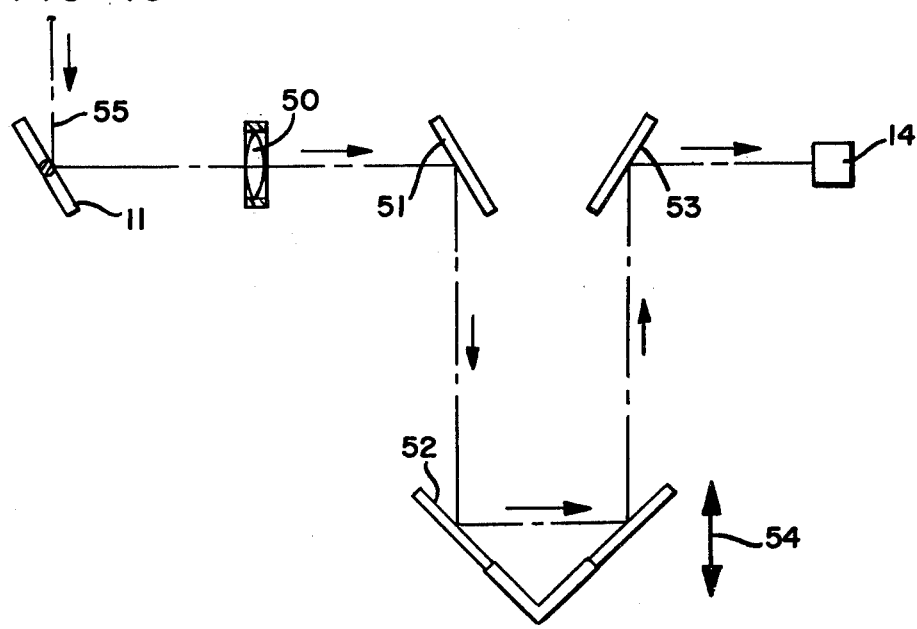
FIG. 10 illustrates field flattening in accordance with an alternative embodiment of this invention.

An alternative arrangement for flattening of the optical field is illustrated in FIG. 10 as comprising an imaging lens 50, a pair of fixed mirrors 51 and 53, and a movable corner mirror 52. Lens 50 and mirrors 51, 52 and 53 are positioned in the optical path in lieu of lens system 12 of the first described embodiment. In accordance with this second embodiment the corner mirror 52 is oscillated linearly as indicated by the arrow 54. Movement of mirror 52 occurs in synchronism with the scanning of document 15. This adjusts the optical path length, so that the image at the face of photodetector assembly 14 is always in focus. There is, however, a minor change in magnification, which distorts the image somewhat at the ends of the scan.

Figure 11:
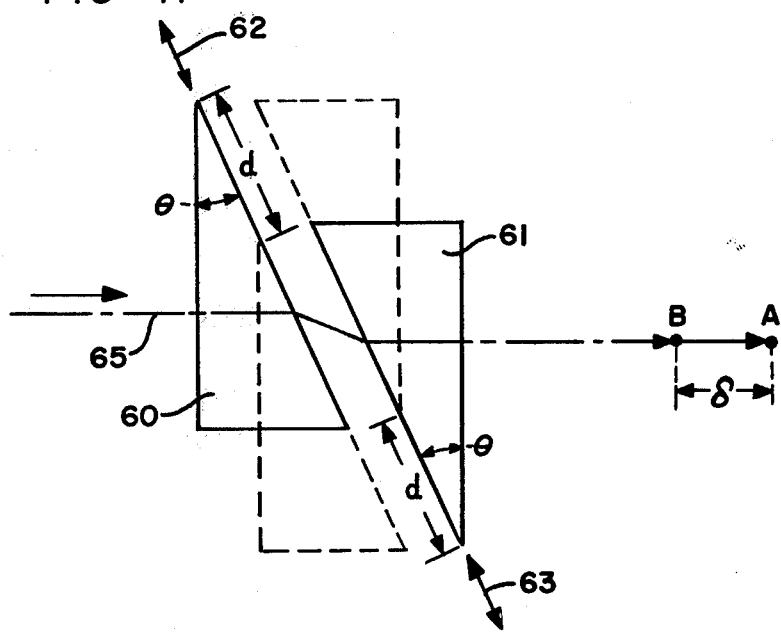
FIG. 11 illustrates field flattening in accordance with another alternative embodiment of this invention.

FIG. 11 illustrates a third arrangement for accomplishing optical field flattening. This arrangement includes a pair of triangular prisms 60 and 61, which are positioned in the optical path. Prisms 60 and 61 have an apex angle θ and are reciprocated as indicated by the arrows 62 and 63. Reciprocating movement of the prisms occurs in sychronism with the scanning of the document 15. This arrangement takes advantage of the fact that the optical system is scanning a narrow strip of document extending perpendicular to the plane of FIG. 11. As the reflected light from this strip approaches the pair of prisms, it sees what appears to be a pair of plane parallel plates having a thickness which changes from time to time. It is well known that a plane parallel glass plate produces longitudinal displacement of an image by an amount given approximately by the formula:

$$\delta = \frac{(N-1)t}{N}$$

where t is the thickness of the plate and N is the index of refraction of the glass. For a pair of prisms as illustrated in FIG. 8, it can be shown that the displacement of the image is given approximately by the formula:

$$\delta = 2d \sin \theta \left(1 - \frac{1}{N}\right)$$

where it is understood that the angle θ is less than the critical angle for the glass/air interface, which may be in the neighborhood of about 35°.

It will be understood that the distance d should at all times be adjusted such that the above calculated image motion is equal to the change in the object distance. It therefore follows that d should be adjusted in accordance with the formula:

$$d = \frac{R(\sec \alpha - 1)}{2 \sin \theta \left(1 - \frac{1}{N}\right)}$$

For a typical case where R is 32 in., θ 25°, and N has a value of 1.75, the above expression reduces to the form:

$$D = 88.34 (\sec \alpha - 1)$$

It is a relatively simple matter to provide a cam mechanism which will produce movement of prisms 60 and 61 in accordance with the above formula. In a typical case for a document having a maximum length of 10 in., the angle α has a maximum value of about 8.88° and the prisms are each moved a maximum of distance of 1.072 in.

In actual operation, prisms 60 and 61 may be positioned as indicated by phantom lines in FIG. 8 when the center of document 15 is focussed on photo-detector array 14. For that condition, the image plane may be positioned at point A of FIG. 8. Then as scanning progresses, the prisms are moved inwardly toward the positions indicated in solid lines. This has the effect of moving the image plane inwardly from point A to point B. However, the movement of the object simultaneously causes movement of the image plane an equal amount in the opposite direction so that image 26 remains in focus.

While the forms of apparatus herein described constitute preferred embodiments of the invention, it is to be understood that the invention is not limited to these precise forms of apparatus, and that changes may be made therein without departing from the scope of the invention.

What is claimed is:

1. A document scanning system comprising:
    flat bed document support means for supporting a document to be copied,
    illumination means for creating an elongated beam of illuminating light and directing said beam of light toward said document support means to create an illuminated strip extending in a first direction across said document,
    an illumination scanner for causing said beam of illumination to move cyclically across said document in a second direction perpendicular to said first direction,
    imaging means for observing at least that portion of said document including said strip and projecting an image of the strip upon an image plane,
    an image scanner operating in sychronism with said first scanning means and arcuately controlling the viewing angle of said imaging means so that the light reflected from said strip is directed toward an imaging window within said image plane,
    image detecting means positioned within said imaging window and comprising planar array of photodetectors for sensing the light levels at spaced positions extending across substantially the full extent of said image,
    field flattening means operable in synchronism with said image scanner for maintaining the image plane of said imaging means coincident with the plane of said photodetectors, and
    image shifting means operable in synchronism with said image scanner for causing overall relative lateral movement between said image and said photodetectors in a amount equal to the distance between said spaced positions during a plurality of scans of said image scanner.

2. Apparatus according to claim 1 wherein said field flattening means comprises a collimating lens positioned for collimating the light reflected from said strip and transport means for moving said lens to maintain said strip at the focal point thereof.

3. Apparatus according to claim 1 wherein said field flattening means comprises a movable mirror in the path between said imaging means and said imaging plane and movement means for moving said imaging means and movable mirror in sychronism with the movement of said image scanner and said illumination scanner.

4. Apparatus according to claim 1 wherein said field flattening means comprises a pair of movable optical wedges and positioned between said imaging means and said image plane and means for moving said wedges to adjust the effective thickness of the portion of said wedges through which imaging light is transmitted.

5. Apparatus according to any of claims 1-4 wherein said illumination means comprises a line source of illumination and a curved illumination reflector for collecting illumination from said line source and directing a narrow, substantially one-dimensional image of said line source on said document.

6. Apparatus according to claim 5 and further comprising illuminator positioning means synchronized with said illumination scanner for moving said curved illumination reflector to maintain one-dimensional focus of said line source image on said document.

7. Apparatus according to claim 6 wherein said illumination scanner comprises a flat illumination reflector positioned in the image path of said curved illumination reflector and rotary drive means for rotating said flat illumination source about an axis parallel to said line source.

* * * * *